March 8, 1938.

C. H. PARSONS 2,110,237

SEDIMENT TESTER

Filed March 6, 1936

WITNESS

Clinton H. Parsons
INVENTOR

BY

ATTORNEY

UNITED STATES PATENT OFFICE 2,110,237

SEDIMENT TESTER

Clinton H. Parsons, Chicago, Ill., assignor to Swift and Company, Chicago, Ill., a corporation of Illinois Application March 6, 1936, Serial No. 67,463

3 Claims. (Cl. 23—258)

This invention relates to a filtering device particularly adapted for determining the amount of sediment in a sample of fluid such as cream.

In recent years the dairy industry has been particularly concerned with the problem of improving butter quality. An important factor in this work has been the attempt to eliminate extraneous matter. In some States cream is purchased on a graded basis, more being paid for #1 cream than for #2 cream. The grade of the cream is determined by test, smell, acidity and the amount of sediment or extraneous matter which it contains.

The most common method employed for making sediment tests involves transferring four ounces of cream from the cream can to a small metal cup and adding eight ounces of a weak solution of sodium bicarbonate having a temperature of at least 180° Fahrenheit. The sodium bicarbonate solution is thoroughly mixed with the cream and the mixture transferred to a metal container provided with a filter disk at one end. By means of a small rubber bulb air is forced above the solution causing the mixture of cream and sodium bicarbonate solution to pass through the filter disk which retains the sediment. Other sediment testers have been designed, it being common to all of them that two to four ounces of cream are used and that the cream is forced through a filter disk of some kind by means of air pressure or vacuum.

Due to the time required in making tests with equipment of this kind it is customary to make a sediment test on the cream from a given producer but once a month. It is customary, however, to make a fat test with conventional Babcock testing equipment from each lot of cream, samples being taken from every can in a given lot.

The present invention provides a device which may be employed to make a sediment test concurrently with the fat test.

In the drawing, Figure 1 is a side view of a preferred embodiment of the device of the present invention.

Figure 2:
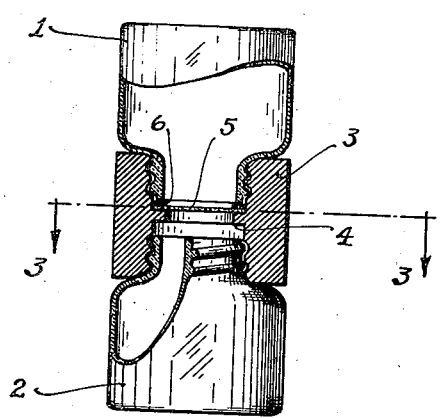
Figure 2 is a view, partly in section, of the device shown in Figure 1.
Figure 1:
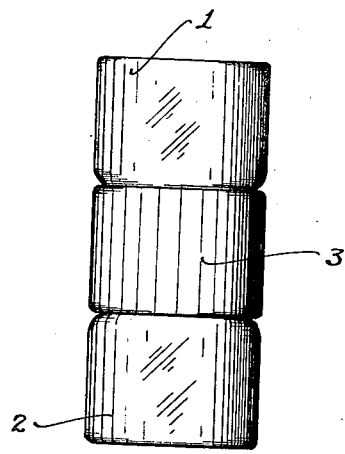
Figure 3:
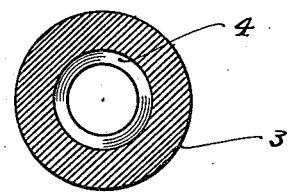
Figure 3 is a sectional view on the line 3—3 of Figure 1.

The device comprises two threaded bottles 1 and 2 adapted to be screwed into union 3 provided with diaphragm 4 which is adapted to hold filter pad 5 in conjunction with which may be employed washer 6.

In assembling the device, filter pad 5 is placed on the shoulder formed by diaphragm 4, washer 6 is placed thereon to hold filter pad 5 in position and bottle 1 is screwed into union 3 forcing washer 6 and filter pad 5 firmly against diaphragm 4 and bottle 2 is screwed into the union from the opposite side.

When it is desired to use the device one ounce of cream at a temperature of from 100° Fahrenheit to 110° Fahrenheit and twenty cubic centimeters of a warm, weak caustic soda or sodium bicarbonate solution thoroughly mixed with the cream is placed in bottle 1 which is then screwed up tight with the filter pad in place. The bottle is then transferred to a Babcock centrifugal cream tester with the fat test on the particular purchase of cream. Seven minutes is required to make a Babcock fat test. During this period of time all of the cream in bottle 1 will have passed through the sediment pad to bottle 2, the sediment contained in the cream being retained on the filter pad.

It will be seen, therefore, that the present invention provides a simple method for making a sediment test which may be carried on concurrently with the fat test.

It will be understood that variations may be made in the procedure and changes made in the device without departing from the spirit of the invention as defined in the claims which follow.

I claim:

1. A sediment tester comprising two vessels each having an open mouth provided with a threaded neck joined in opposed relationship by a threaded union, and a filter interposed between said vessels.

2. A sediment tester comprising two vessels each having an open mouth provided with a threaded neck and joined in opposed relationship by a threaded union provided with an interior shoulder, and a filter pad held against said shoulder by one of said vessels.

3. The method of testing cream for sediment which comprises placing a quantity of cream in one of a pair of open mouthed vessels mounted in opposed relationship at their respective mouths and with a filter pad therebetween and centrifugally spinning said vessels in a manner to force said cream through said filter pad and into the other of said vessels.

CLINTON H. PARSONS.